INVENTORS:
Donald W. Herrick
Robert A. Beam

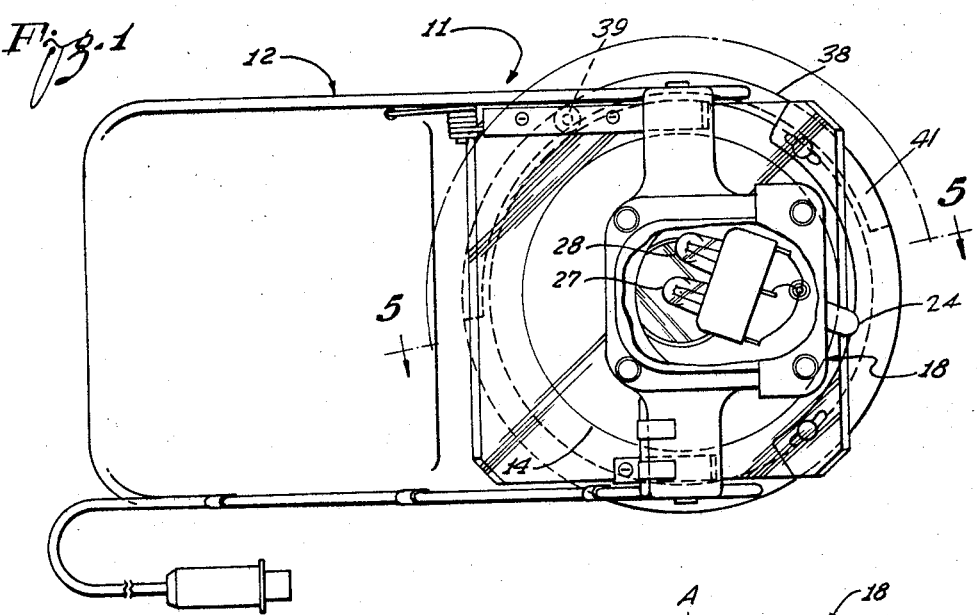
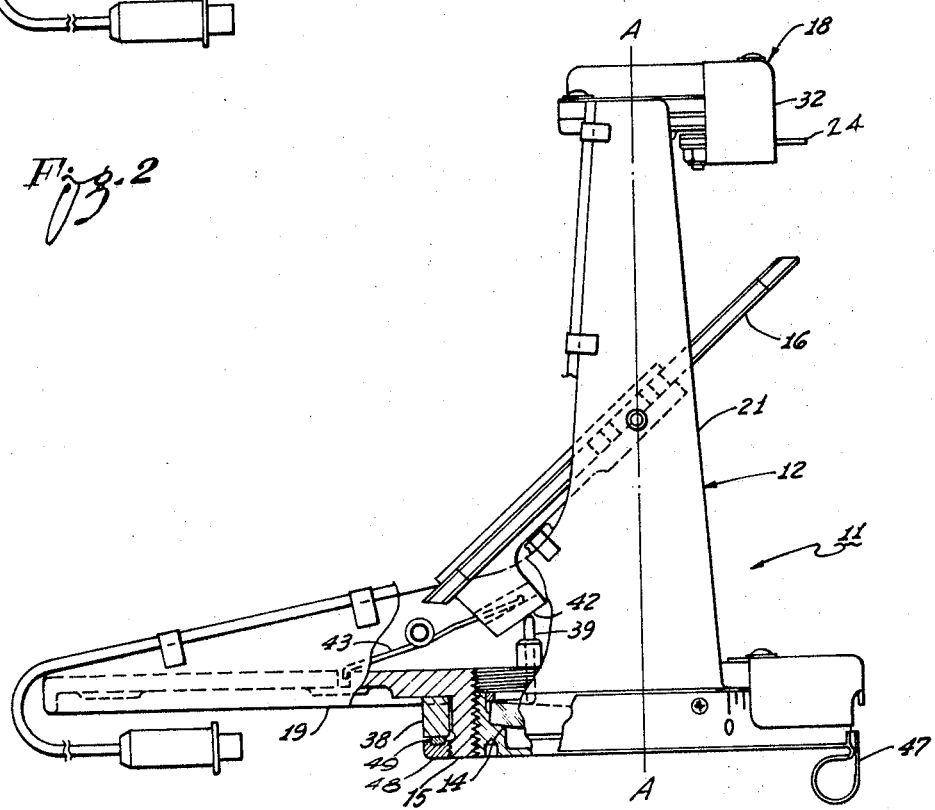

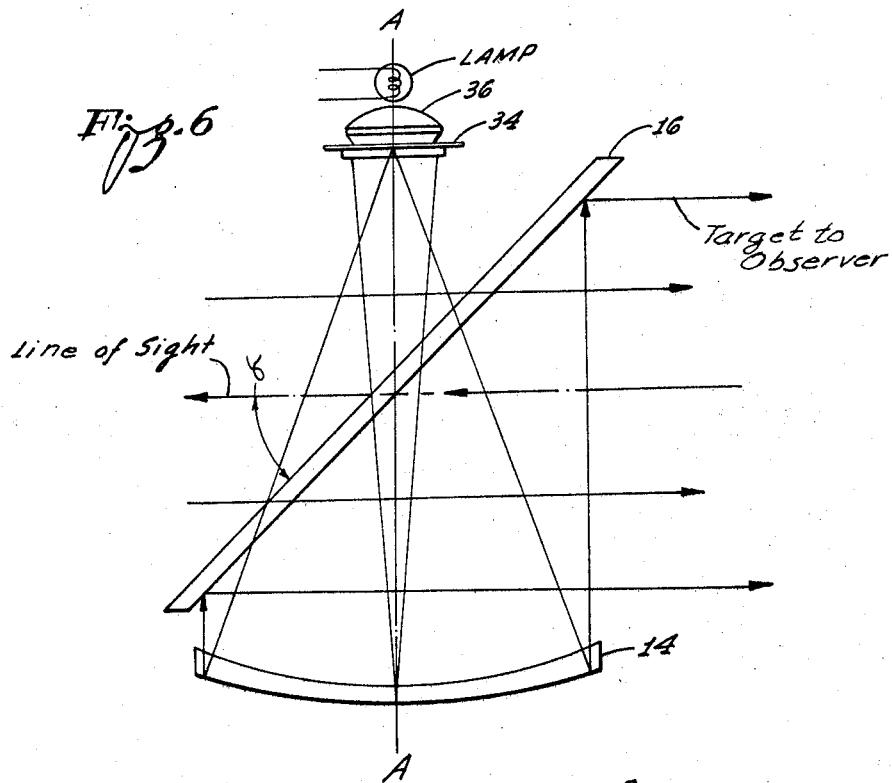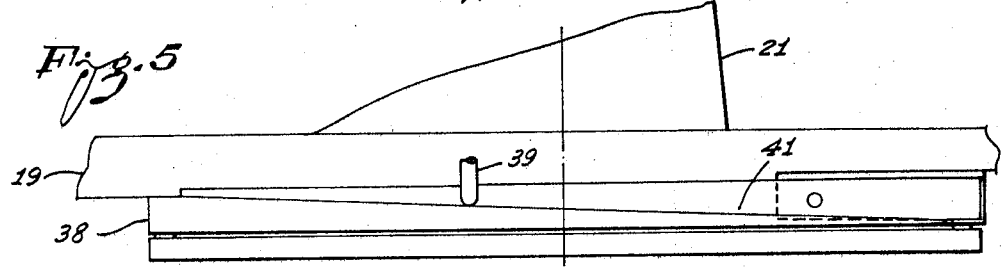

United States Patent Office 3,423,155
Patented Jan. 21, 1969

3,423,155
OPTICAL SIGHT
Donald W. Herrick, Gardena, and Robert A. Beam, La Habra, Calif., assignors to Northrop Corporation, Beverly Hills, Calif., a corporation of California
Filed Apr. 13, 1964, Ser. No. 359,317
U.S. Cl. 356—252     3 Claims
Int. Cl. G02b 23/10

This invention pertains to optical equipment and more particularly to improvements in optical sights.

The sight as disclosed herein utilizes collimated light to provide a reference image on a combining screen. The screen being transparent enables an observer to directly see a target and simultaneously a reference image. The reference image constitutes an optical image and appears to the observer as though it were located at infinity.

Primarily the instant sight is designed for use on the instrument panel of an aircraft. Briefly the sight includes a pair of quartz lamps, one functioning as a primary lamp and the other as a secondary lamp utilizable in case of primary lamp failure. The secondary or backup lamp may be quickly and easily substituted for the primary lamp. The instant sight also embodies a mils depression mechanism of compact design enabling the sight to be utilized in delivering stores as well as an aid in the firing guns or in cannons. At such times as the instant sight is integrated into an aircraft armament system the features discussed above provide a factor of safety and allows the entire sight to be mounted on (above) the aircraft's instrument panel without seriously infringing the pilot's forward vision.

Accordingly it is an object of the present invention to provide an optical sight embodying means improving the reliability and operating characteristics thereof.

Another object is to provide an optical sight utilizing an artificial light source for creating an image and embodying means whereby either of a pair of light sources may be readily positioned in the sight's optical path.

Another object is to provide an optical sight embodying a mils depression feature of compact design enabling the sight to be utilized in the delivery of stores and also in the firing of guns or cannons.

Another object is to provide an optical sight which can be mounted on the instrument panel of an aircraft without seriously infringing the forward vision of the pilot of the aircraft.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURES 1 and 2 constitute plan and side elevational views, respectively, of the sight as disclosed herein, parts of the sight being broken away to clarify the construction thereof.

FIGURE 5 is an enlarged fragmentary view of the sight as viewed along the line 5—5 of FIGURE 1.

FIGURE 6 is a schematic view of the sight disclosed herein illustrating the manner in which it operates.

Figure 3:
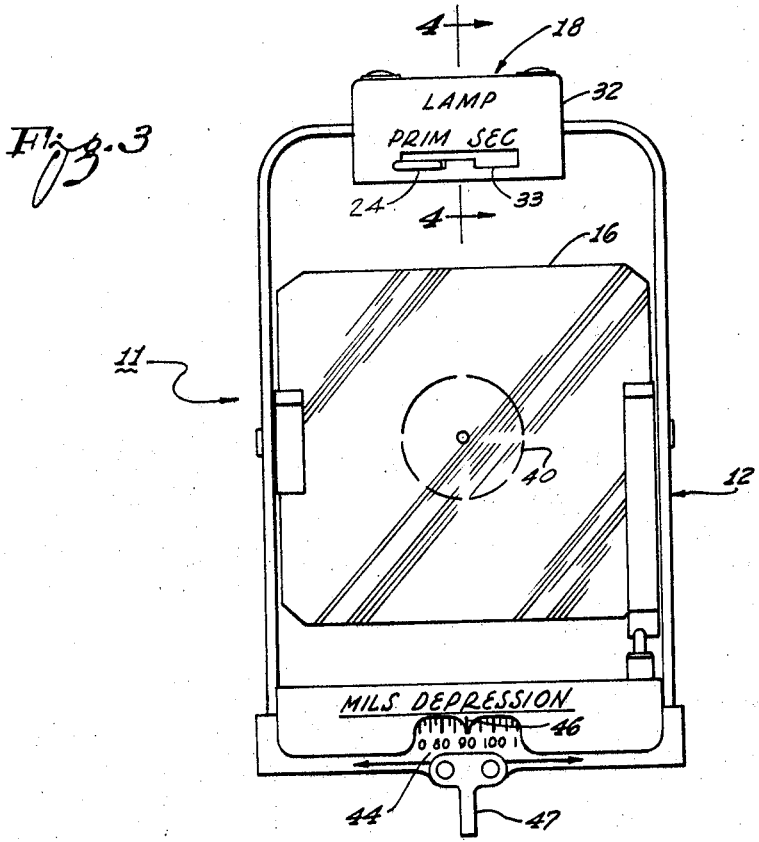
FIGURE 3 is a rear elevational view of the sight shown in FIGURES 1 and 2.

Referring to the drawings, here an optical sight 11 including a frame member 12, a mirror 14, a viewing plate 16 and an image and light producing assemblies 17 and 18, respectively, as disclosed herein is shown. The subject sight is designed for mounting and use in an aircraft, however, it may be used and has applications elsewhere.

The frame member 12 is of integral construction consisting of base and upright portions 19 and 21, respectively. The base portion provides means for securing the sight to structure in the cockpit of an aircraft and the base and the upright portions provides means on and in which other components of the sight are mounted. The upright portion is of inverted U-shaped configuration having the assemblies 17 and 18 mounted at its summit or upper portion. The mirror 14 is of the Mangin type and is mounted in the base 19 as best seen in FIGURE 2. As mounted the axis A—A of the mirror passes through the crest of the upright portion of the frame member 12.

Figure 4:
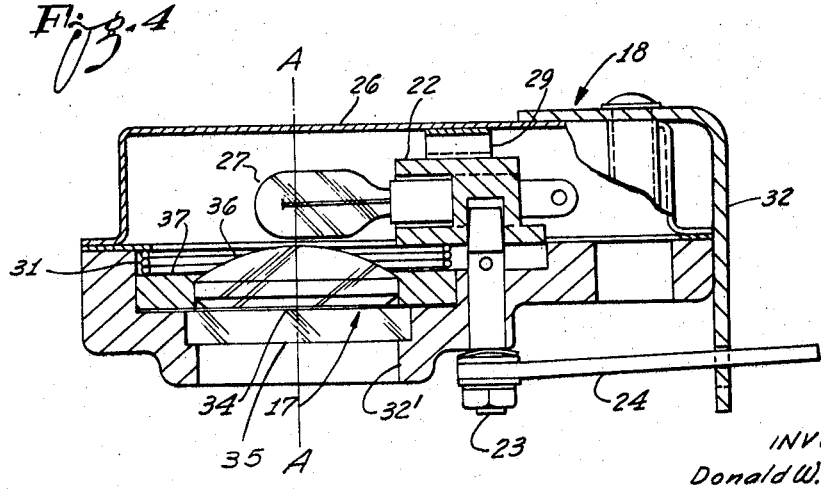
FIGURE 4 is an enlarged fragmentary sectional view of the sight taken along the line 4—4 of FIGURE 3, the lamps being shown in their centered position.

Referring to FIGURES 1 and 4 it will be seen that essential components of the assemblies 17 and 18 are positioned directly above the mirror 14. Major components of the light producing assembly 18 includes dual socket means 22, pin 23, lever 24, housing 26 and a pair of quartz lamps 27 and 28. The lamps are positioned in the socket means and, hereafter, are referred to as primary and secondary lamps 27 and 28, respectively. As assembled, the socket means 22 is mounted for pivotal movement in response to pivotal movements of the pin 23. The socket means is maintained in position as shown by spring means 29 and 31, the latter spring being received in a stepped aperture 32′ provided at the summit of the upright portion of the frame member 12. The relationship of the springs 29, 31 and the socket means 22 are maintained by a housing 26 which in turn is secured to the frame member 12. A shield member 32 having a stepped aperture 33 provided therein functions to provide positioning and retaining means for the lever 24, the purpose and complete function of the positioning means will become apparent as the disclosure progresses.

The image producing assembly 17 includes a thin opaque disc 34, filter 35, lense 36 and ring member 37 positioned in the aperture 32′. The disc 34 has perforations formed therein, the perforations defining a reticle pattern the characteristics and reflection of which is shown and indicated by the numeral 40 in FIGURE 3. The reflection of the reticle pattern on the plate 16 appears in an observers line of sight as though it were located at infinity.

It will now be seen by referring to FIGURES 2 and 4 that the filament of the primary lamp 27 is located on the axis A—A of the mirror 14 at such times as the lever 24 is positioned in the primary position in the aperture 33. If for any reason, the lamp 27 fails it is merely necessary to move the lever 24 to the secondary position which automatically shifts the secondary lamp 28 to the position previously occupied by the primary lamp 27. Thus it will be seen that the lamps 27 and 28 impart a factor of safety to the sight 11 not found in sights of similar character if loss of vacuum or breakage occurs in a single lamp with a double filament.

Incorporated in the base of the sight 11 is structure enabling the sight to serve a dual function viz to effect a bombing or stores delivery operation as well as in the firing of guns or cannons.

Structure enabling the sight to serve a dual function includes a camming ring 38 cooperating with a pin-like member 39. The ring 38 has a surrounding relation with respect to a depending portion 15 of the base portion of the sight 11 as best seen in FIGURES 1, 2 and 5. The pin 39 is mounted for vertical reciprocal movement in the base portion 19 at a location directly above the ring 38. A portion of the ring 38 includes a tapered portion 41 adapted to impart linear movement to the pin-like member 39 as a result of rotary movement imparted to the ring 38. The ring 38 is maintained on the aforementioned depending portion by means of a ring nut 48 as best seen in FIGURE 2. A wave washer 49, positioned between the ring and nut 38 and 48, respectively, provides a sliding relation between the ring, base and nut allowing the ring 38 to be positioned at any regular position desired with respect to the depending portion 15.

The end of the pin member 39, i.e., the end removed from the ring 38, bears on an inclined surface 42 of the viewing plate 16. In this respect it will be seen that the plate 16 is pivotally mounted between the arms of the upright portion of the frame 12. A spring 43 functions to continuously maintain the surface 42 in contact with the pin member 39. The exact location of the tapered portion of the ring 38 can be varied with respect to the frame 12, accordingly the angular relation of the viewing plate 16, with respect to the observers line of sight (FIGURE 6) will be apparent by referring to calibrations 44 carried by the ring 38 and indicating means 46 carried by the frame 12. Also provided on the ring 38 is knob means 47 enabling an operator of the sight to rotate and position the ring 38.

When mounted in an aircraft, the sight 11 serves as an aid in effecting a gunnery or bombing operations in the following manner.

Considering first a gunnery operation, the ring 38 is rotated to a position in which zero (0) of the calibrations is positioned directly below the indicating means 46. Under these conditions the angular relation of the plate 16 with respect to observers line of sight is indicated by the angle α in FIGURE 6. The size of the image circle 40 is referred to in mils and is used extensively in aerial gunnery to provide ranging information. In the present embodiment, the reflected image 40 (as it appears on the plate 16) is approximately 2.4″ in diameter and appears as a circle having a 100 ft. diameter at approximately 1000 ft. range. Accordingly it will be apparent that the sight 11, including ring and pipper image 40, provides means aiding a pilot in aligning his guns with a target and the ring 40 also is helpful to an observer or pilot in determining range.

At such time as the sight is utilized in the dropping of stores or for bombing operations, the plate 16 is depressed—in other words the ring 38 is rotated to a new position in which the angle α is increased with respect to the observer line of sight. Thus it will be seen that the sight can be used as an aid in dropping stores or bombs which follow a curved path as well as for aiming his guns.

Attention is also directed to the fact that all operating components of the sight—including the optical path of the sight—are located within or immediately adjacent to the frame 12. This type of construction insures a sight of compact design rendering it especially useful in aircraft construction.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

1. An optical sight comprising a frame having upright and base portions, said upright portion being of inverted U-shape with spaced legs extending upwardly from said base portion and with a horizontal member joining said legs at the summit thereof, said base portion extending generally horizontally and having a cylindrical ring part depending beneath the legs of said upright portion, a light source and an opaque disc having a light-transmitting portion therein defining a reticle, said light source and said reticle being encased and mounted upon said horizontal member of said upright frame portion and adapted to project a light beam downwardly therefrom, a Mangin mirror fixed within said cylindrical ring part facing said light source, said light source including a plurality of lamps and means enabling one of said lamps to be quickly and easily moved into position directly above said mirror, a transparent viewing plate pivotally mounted between and upon said legs and between said light source and said mirror whereby an optical image of said reticle may be provided on said viewing plate, an annular cam member surrounding and supported rotatably upon said cylindrical ring part and having an upper surface with a constant inclination with respect to a lower surface, a rigid cam follower supported for reciprocation upon said base portion and extending between said upper surface of said annular cam member and said viewing plate, and resilient means maintaining continuous contact between said cam follower, said upper surface of said cam member and said viewing plate whereby the angular relation of said viewing plate with respect to said mirror may be varied by turning said annular cam member.

2. An optical sight as set forth in claim 1, and in which said opaque disc is perforated to constitute said light-transmitting portion.

3. An optical sight as set forth in claim 1, and in which said annular cam member has calibrations along its periphery which cooperate with indicating means on the base portion of said frame.

References Cited

UNITED STATES PATENTS

| 2,324,444 | 7/1943 | Wappler | 240—37 |
| 2,358,794 | 9/1944 | Dalton | 88—2.3 |
| 2,377,064 | 5/1945 | Aufiero | 88—2.3 |
| 2,405,263 | 8/1946 | Lynn | 88—1 X |
| 2,490,747 | 12/1949 | Creighton | 88—2.3 |
| 2,566,389 | 9/1951 | Walk | 88—1 X |
| 2,725,781 | 12/1955 | Banker | 88—2.3 X |
| 3,216,308 | 11/1965 | Northcutt | 88—1 |

DAVID SCHONBERG, Primary Examiner.

T. H. KUSMER, Assistant Examiner.

U.S. Cl. X.R.

240—37